Patented Dec. 12, 1944

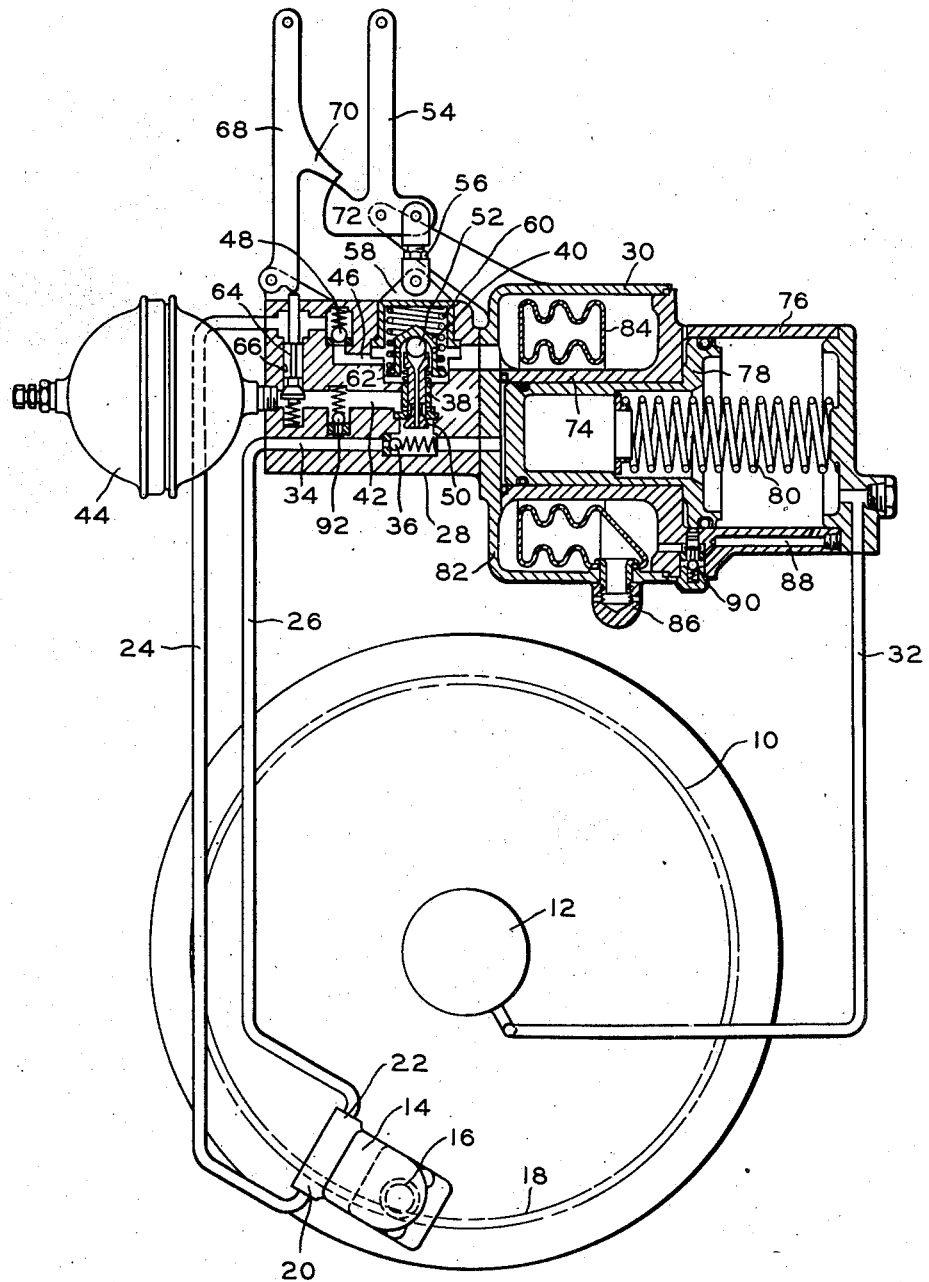

2,365,126

UNITED STATES PATENT OFFICE 2,365,126

POWER TRANSMISSION

Harry F. Vickers and Raymond C. Griffith, Detroit, Mich., assignors to Vickers Incorporated, Detroit, Mich., a corporation of Michigan Application March 2, 1943, Serial No. 477,734

5 Claims. (Cl. 244—103)

This invention relates to power transmissions, particularly to those of the type comprising two or more fluid pressure energy translating devices, one of which may function as a pump and another as a fluid motor.

The invention is more particularly concerned with a power transmission system adapted for use upon the landing wheels of an aircraft for the purpose not only of operating the braking mechanism of such landing wheels, but also for functioning as a wheel spinning device preparatory to landing.

On large-size aircraft, the landing wheel brakes are customarily of the power-operated, hydraulic type, that is, the braking mechanism is placed into operation by the admission of fluid under pressure from a suitable power-driven, pressure-generating means. The admission of this fluid pressure is usually under the control of a self-equalizing brake valve wherein the manual effort applied to the control member of the valve determines the fluid pressure applied to the braking mechanism, and the valve automatically either exhausts fluid from the brake line or admits pressure fluid thereto until a desired pressure balance is established.

Since the landing carriage is customarily retractable and since the wheels are a considerable distance from the pilot's position in a large ship, the long lines and complicated flexible fittings necessary to conduct fluid pressure from the brake valve to the brake mechanism at the landing wheels have involved considerable difficulty.

It is an object of the present invention to provide an improved braking system wherein a complete, self-contained, hydraulic system may be mounted upon the retractable undercarriage and may be entirely independent of the normal hydraulic power system provided for other purposes upon the aircraft.

It is a further object to so arrange such a system that the rotation of the wheels during landing may be relied upon for furnishing the motive power to generate a suitable supply of pressure fluid for brake applying purposes.

It is also an object to so arrange such a self-contained power system as to prevent the application of sufficient braking force to cause locking of the wheels during landing.

Another problem which is encountered in very large aircraft is that of accelerating the tremendous mass in the landing wheels at the instant when they first contact the earth. At relatively high landing speeds, the energy required to bring the wheels up to their necessary rotating speed is so large as to cause severe strain upon the tires, the landing carriage and other parts of the plane.

It is accordingly an object of the present invention to so arrange a self-contained, hydraulic system upon the undercarriage of a plane as to admit of a wheel spinning operation by means of hydraulic power prior to actual contact of the wheels with the ground.

Further objects and advantages of the present invention will be apparent from the following description, reference being had to the accompanying drawing wherein a preferred form of the present invention is clearly shown.

In the drawing:

The single figure is a diagrammatic view of a power transmission system embodying a preferred form of the present invention.

In the drawing there is represented at 10 the landing wheel of an airplane having a fluid-operated braking mechanism generally designated at 12. A suitable rotary fluid pump or motor unit 14 is drivingly connected with the wheel 10 by means of a pinion 16 on the drive shaft of the unit 14 and arranged to mesh with a ring gear 18 provided on the wheel 10.

The motor 14 has an inlet 20 and an outlet 22 which are connected by means of pipes 24 and 26, respectively, with a valve block 28. The valve block 28 is secured to a combined tank and debooster unit generally designated 30 which in turn is connected by a pipe 32 to the brake mechanism 12.

The valve block 28 is provided with a passage 34 extending between the line 26 and the high-pressure end of the debooster in the unit 30. A check valve 36 is interposed in this passage. To the right of the check valve 36 there is formed a vertical bore 38 in which is mounted a self-equalizing brake valve generally designated as 40 and arranged to control the pressure in the passage 34 beyond the valve 36. The bore 38 intersects a horizontal passage 42 which leads to a fluid pressure accumulator 44 of conventional construction for storing liquid under pressure maintained by an elastic medium. The bore 38 also intersects a third horizontal passage 46 which extends between the conduit 24 and the tank portion of unit 30. A check valve 48 is located in the passage 46 permitting flow out of the tank into the passage 24. It will thus be seen that the passage 46 carries liquid at atmospheric pressure, while the passage 42 carries liquid at the pressure stored in the accumulator, and the passage 34 carries liquid at a pressure determined by the adjustable pressure brake valve 40.

The latter may be of any well-known constrution and, in the form illustrated, comprises a downwardly-opening poppet valve 50 having a central through-bore. The poppet 50 is arranged, when open, to admit pressure fluid from passage 42 to passage 34. At the upper end of the poppet valve 50, the through-bore thereof is controlled by a ball valve 52 which, when lifted off from its seat on the poppet 50, will exhaust liquid from the passage 34 through the central bore of the poppet 50 to the tank passage 46.

The two valves are controlled manually by means of a lever 54 which is arranged by means of a link 56 to control the position of an upper spring abutment 58 and thus determine the degree of compression of a spring 60. The latter has its lower end disposed upon a cage 62 which rests upon the ball valve 52 and thereby opposes the fluid pressure in passage 34 which is transmitted through the central bore of poppet 50 and exerted over the lower surface of the ball valve 52.

The passages 42 and 46 are arranged to be selectively connected for wheel spinning purposes by means of a poppet valve 64 arranged in a vertical passage 66 connecting passages 42 and 46. The poppet valve 64 may be controlled by means of a lever 68 which is interlocked with the lever 54 by means of arcuate projections 70 and 72. These are so arranged, as is obvious from their shape, that only one of the levers 54 or 68 can be moved in a clockwise direction from its neutral position, illustrated. In other words, when either lever is moved out of neutral position, it automatically blocks movement of the other lever.

The tank and debooster unit 30 consists of a differential cylinder comprising the bores 74 and 76 of small and large diameters, respectively. Slidable within these bores is a differential piston 78 which is biased to the left by a light spring 80. The passage 34 terminates at the left end of the bore 74, while the pipe 32 communicates with the right end of the large bore 76. Thus, any pressure which is supplied through conduit 34 will be reduced in value at the conduit 32 by the ratio of the respective diameters of the bores 74 and 76. The use of such unit is, of course, optional but is found desirable in installations where the brake-operating mechanism cannot be designed to operate at as high a pressure as can the pump or motor unit and the brake valve unit.

The tank portion of the unit 30 consists of an annular chamber 82 surrounding the cylinder 74 and completely sealed from the atmosphere. A collapsible, flexible bag 84 may be mounted in the chamber 82 and may have an air vent fitting 86 whereby atmospheric pressure is maintained within the bag 84. Thus, expansion and contraction of the volume of oil in the system and compensation for leakage and other factors are automatically taken care of, regardless of the position of the air craft relative to the force of gravity or other forces acting upon the body of liquid in the tank 82.

The unit is provided with a passage 88 extending between the chamber 82 and the right end of cylinder 76. The passage 88 is controlled by a small poppet valve 90 which is arranged to be normally closed but is cammed open by contact of the piston 78 with the projecting stem of the valve whenever the piston returns to its neutral position, illustrated. In this manner the chambers communicating with the pipe 32 are arranged to be prefilled during idle operation of the device, and expansion and contraction of the liquid within these chambers may be automatically provided for by this connection to the tank during periods of non-operation of the brake. A check valve 92 is provided to admit flow from passage 34 to passage 42 under certain conditions later to be described.

In operation, with the parts in the position illustrated and with the system filled with oil, it will be seen that rotation of the wheel 10 and pump or motor unit 14 will withdraw liquid from the tank chamber 82 through passage 46, check valve 48 and pipe 24 and deliver it through pipe 26, passage 34 and check valve 36, through the central bore of poppet valve 50 and past the exhaust valve 52 back to the tank chamber 82. Thus, the wheel may be rolled freely, and the hydraulic system imposes no significant drag thereon. This condition will maintain during take-off of the aircraft. The accumulator is isolated from this circulatory path by closure of check valve 92 and poppet valves 50 and 64.

When, however, it is desired to land, the wheel 10 may be given an initial spin by shifting the lever 68 clockwise to open poppet valve 64 and thus admit pressure fluid from the accumulator to the motor inlet line 24. The check valve 48 prevents flow back to the tank chamber 82 so that the unit 14 is caused to act as a fluid motor and rotate the wheel 10, discharging liquid back through line 26 and through the same path to the tank chamber 82. In this way the accumulator is exhausted, and, when this occurs, no more flow can take place from the accumulator 44 and the unit is automatically bypassed by the check valve 92 which opens for flow from the passage 34 to the passage 42. Thus, the inertia of the wheel 10 may continue its rotation for an interval, during which the wheel will normally contact the ground and its acceleration be completed thereby.

When it is desired to brake the wheel, lever 68 will be returned to its neutral position, thus closing the poppet valve 64. Thereafter, until the brakes are applied, the pump or motor unit 14 is bypassed through the central bore of the poppet valve 50, as previously described during take-off. Lever 54 may now be operated clockwise to increase the pressure of spring 60 upon exhaust valve 52, thereby closing the exhaust passage and tending to open the poppet valve 50. Oil will now be withdrawn from the tank chamber 82 and delivered through check valve 36 to go back through the now open seat of poppet valve 50 to the passage 42 and tend to recharge the accumulator 44. As this charge is increased, the pressure in passage 34 increases and accordingly is exerted over the lefthand end face of piston 78, thus compressing the spring 80 and applying a proportionate braking pressure in the conduit 32 and the brake mechanism 12. It will be seen that this process will continue, and, as the accumulator becomes more charged, the pressure therein will rise and will correspondingly increase pressure in the brake mechanism 12. When this pressure reaches a value equivalent to the compression of the spring 60, poppet valve 50 will be closed, and a further increase in pressure caused by the continued pumping of unit 14 will lift the exhaust valve 52 off from its seat and permit exhausting of the pump delivery into the tank again but maintaining, nevertheless, the desired pressure in passage 34. At this time the valve 52 acts in a manner analogous to a pressure relief valve.

It will thus be seen that the accumulator becomes charged with the same degree of pressure as is utilized to apply the brakes, and this pressure is consequently made available for wheel spinning during a subsequent landing. As a corollary action it is also insured that no pressure can be applied to the brakes higher than can be built up by the pump unit 14 under the driving action of the rotating wheel. Since, therefore, the wheel must rotate to cause an increase in brake pressure, assuming lever 54 to be in its fully applied position, it becomes impossible to lock the wheel. In other words, when the wheel approaches a locked condition, the additional pressure necessary to insure complete locking is unobtainable. It will be understood, however, that, although the circuit disclosed embodies this feature inherently, it is possible to dispense with the same where not desired by suitable rearrangement of the parts.

While the form of embodiment of the invention as herein disclosed constitutes a preferred form, it is to be understood that other forms might be adopted, all coming within the scope of the claims which follow.

What is claimed is as follows:

1. A power transmission system for use on aircraft having a landing wheel with a fluid-operated brake and comprising in combination, a fluid pump or motor unit connected in driving relation with the wheel, a fluid pressure accumulator, conduits forming an inlet and outlet to the unit, a fluid reservoir, valve means selectively operable to cause the unit to act as a pump and for supplying fluid from the unit outlet to the brake and accumulator, and additional valve means for selectively supplying fluid from the accumulator to the unit inlet to thereby cause the unit to act as a motor and impart rotation to the wheel.

2. A power transmission system for use on aircraft having a landing wheel with a fluid-operated brake and comprising in combination, a fluid pump or motor unit connected in driving relation with the wheel, a fluid pressure accumulator, conduits forming an inlet and outlet to the unit, a fluid reservoir, valve means selectively operable to cause the unit to act as a pump and for supplying fluid from the unit outlet to the brake and accumulator, and additional valve means for selectively supplying fluid from the accumulator to the unit inlet to thereby cause the unit to act as a motor and impart rotation to the wheel, said system constituting a completely self-contained system associated with said wheel and isolated from the remainder of the aircraft.

3. A power transmission system for use on aircraft having a landing wheel with a fluid-operated brake and comprising in combination, a fluid pump or motor unit connected in driving relation with the wheel, a fluid pressure accumulator, conduits forming an inlet and outlet to the unit, a fluid reservoir, a brake-controlling valve of the type adapted to selectively apply or exhaust pressure fluid to maintain a fluid pressure at the brake in proportion to the effort applied to operate the valve, said unit during landing operations functioning as a pump to supply said brake and charge said accumulator, and a second valve adapted to connect said unit to the accumulator in a manner to drive the unit as a motor to spin the wheel just prior to landing.

4. A power transmission system for use on aircraft having a landing wheel with a fluid-operated brake and comprising in combination, a fluid pump or motor unit connected in driving relation with the wheel, a fluid pressure accumulator, conduits forming an inlet and outlet to the unit, a fluid reservoir, a brake-controlling valve of the type adapted to selectively apply or exhaust pressure fluid to maintain a fluid pressure at the brake in proportion to the effort applied to operate the valve, said unit during landing operations functioning as a pump to supply said brake and charge said accumulator, and a second valve connected between the accumulator and the unit inlet and adapted to connect said unit to the accumulator in a manner to drive the unit as a motor to spin the wheel just prior to landing.

5. A power transmission system for use on aircraft having a landing wheel with a fluid-operated brake and comprising in combination, a fluid pump or motor unit connected in driving relation with the wheel, a fluid pressure accumulator, conduits forming an inlet and outlet to the unit, a fluid reservoir, a brake-controlling valve of the type adapted to selectively apply or exhaust pressure fluid to maintain a fluid pressure at the brake in proportion to the effort applied to operate the valve, said unit during landing operations functioning as a pump to supply said brake and charge said accumulator, and a second valve adapted to connect said unit to the accumulator in a manner to drive the unit as a motor to spin the wheel just prior to landing, the brake valve when in its released condition providing a fluid path to conduct fluid delivered from said unit into the reservoir.

HARRY F. VICKERS.
RAYMOND C. GRIFFITH.